Dec. 11, 1951  H. H. CRAFTON  2,578,515
FASTENING BOLT WITH SWINGING HEAD
Filed Aug. 4, 1949
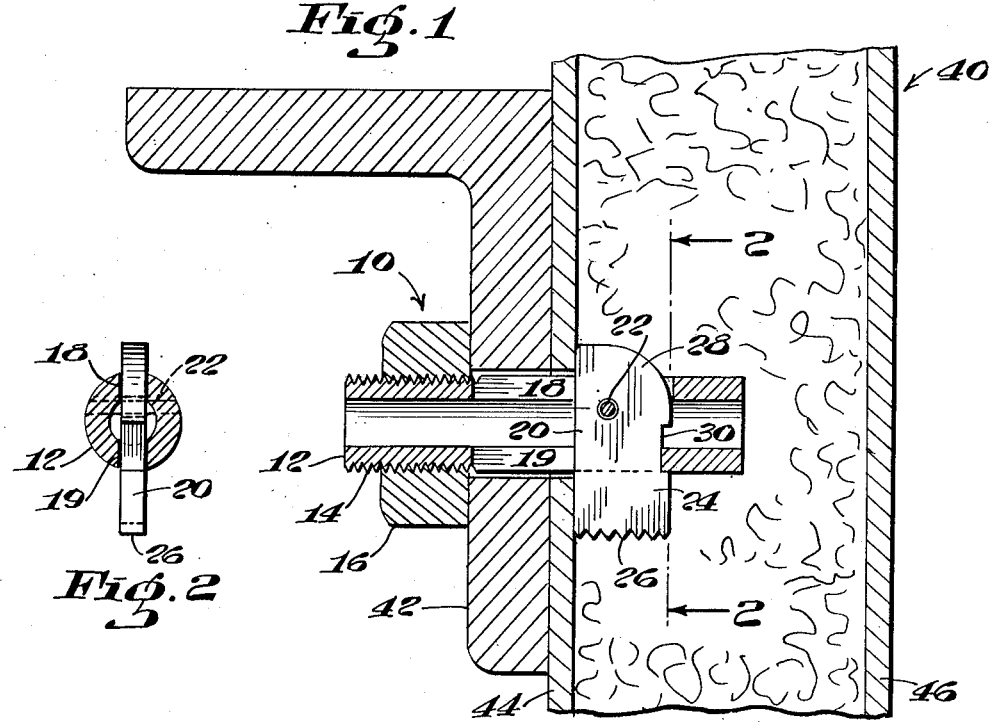
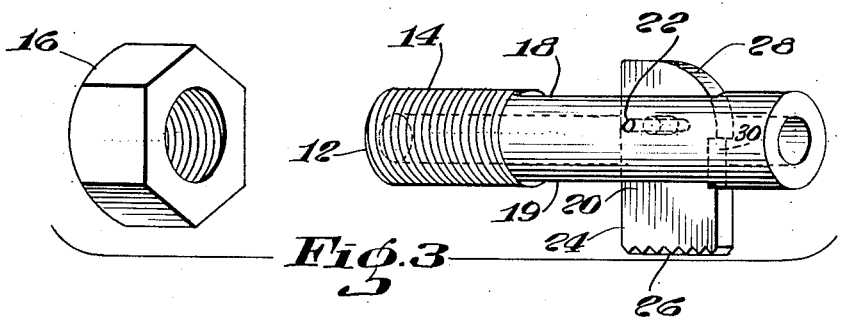
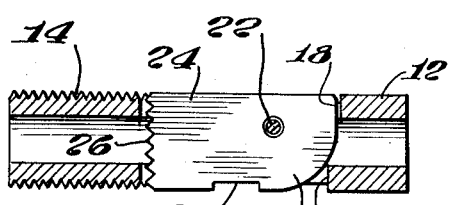
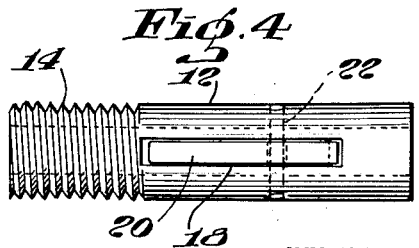
INVENTOR.
Henry H. Crafton
BY J. Stanley Churchill.
ATTORNEY

UNITED STATES PATENT OFFICE 2,578,515

FASTENING BOLT WITH SWINGING HEAD

Henry H. Crafton, Baden, Pa., assignor to H. H. Robertson Company, Pittsburgh, Pa., a corporation of Pennsylvania Application August 4, 1949, Serial No. 108,483

1 Claim. (Cl. 85—3)

This invention relates to a fastening bolt.

In general the object of the invention is to provide a novel and efficient fastening bolt with swinging head capable of general use but which is particularly adapted for use as a blind fastener for securing together a plurality of members in an efficient manner requiring the operator to insert the fastening bolt through aligned holes in the members, and to clamp the same together by operations conducted from one accessible side of the members.

With this general object in view, and such others as may hereinafter appear, the invention consists in the fastener hereinafter described and particularly defined in the claim at the end of this specification.

In the drawings illustrating the preferred embodiment of the invention, Fig. 1 is a cross sectional view of a fastener embodying the present invention, the parts being shown in operative relation for fastening together two members of a building structure; Fig. 2 is a cross-sectional view taken on the line 2—2 of Fig. 1; Fig. 3 is a perspective view showing the parts of the fastener detached; and Figs. 4 and 5 are views in side elevation and longitudinal cross section respectively showing the parts in their initial position for insertion into a preformed opening in the members to be attached.

In general the invention contemplates a fastening member designed to be inserted through preformed and aligned holes in the two or more members to be fastened together. Provision is made for enabling the operator to effect the fastening together of the members by operations performed at the exposed and accessible surface of the first member through which the fastener is passed. As herein shown, a fastener embodying the present invention includes a bolt threaded at one end to accommodate a nut and provided adjacent its other end with an axially aligned elongated through slot closed at both ends and arranged to receive a pivotally mounted trip piece or bar of a size and arranged to be initially positioned longitudinally of the bolt and within the confines thereof to permit the bolts to be inserted through preformed aligned openings in the members to be fastened. In operation, the bolt is extended longitudinally through the opening a distance sufficient to permit the pivotally mounted bar to rock on its pivot into a position at right angles to the longitudinal axis of the bolt and parallel to the inner or rear surface of the inner member being fastened. Thereupon, the nut may be tightened to firmly clamp the members together between the nut and the bar.

An important feature of the present invention resides in arranging the pivotally mounted bar to be loosely mounted on its supporting pin, with a clearance opening of a size sufficient so that when the nut is tightened the rear edge of the bar may bear against a closed end of the slot, thereby relieving the pin from any shearing stress when the bolt is tightened.

Referring now to the drawings, the present fastener, indicated generally at 10, is illustrated as comprising a tubular bolt 12 threaded at one end, as shown at 14, to receive a nut 16. The intermediate portion of the bolt, between the threaded portion and the opposite end, is provided with axially aligned longitudinal slots 18, 19 closed at both ends and extended through opposed side walls of the tubular bolts to accommodate a trip piece or clamping bar 20 pivotally mounted on a pin 22 extended transversely through the bolt right angles to the slot and supported in opposed side walls of the bolt.

As illustrated in Fig. 5, the trip piece 20 is initially rocked on its pivot to assume a position longitudinally of the bolt 12 and with the side edges of the trip piece confined substantially within the bolt to permit the fastener to be inserted into preformed holes drilled or otherwise formed and extending through the members to be fastened together. In practice, the fastener is inserted through the openings a distance sufficient to dispose the trip piece 20 beyond the surface of the inner or rear member being fastened together to enable the trip piece to be rocked on its pivot 22 and to assume a position at right angles to the bolt and parallel to the rear surface of the rear member being fastened. The nut 16 may then be tightened to securely clamp the parts between the nut 16 and the trip piece 20 as shown in Fig. 1.

In the preferred embodiment of the invention, the trip piece 20 may and preferably will be loosely mounted on its pivot pin 22, the trip piece having a substantial clearance opening so that, in operation, when the trip piece is positioned transversely or, the bolt and the nut tightened the closed rear ends of the slots 18, 19, will engage the trip piece and clamp it firmly against the rear surface of the rear member being fastened as shown in Fig. 1, thus relieving the relatively small diameter pivot pin of any shearing stress and placing the entire clamping load on the nut and upon the bolt itself.

As herein shown, the transversely extended pivot pin 22 is offset slightly from the longitudinal axis of the hollow bolt 12 and in addition one arm 24 of the trip piece 20 is made longer than the other arm so that the trip piece may rock of its own weight in a counterclockwise direction, viewing Fig. 5, after the fastener has been extended through the pre-formed openings. In the event that the trip member does not fall into a transverse position of its own accord, a screw driver or other tool may be inserted into the forward and accessible end of the hollow bolt 12 and manipulated to cooperate with the serrated edge 26 formed at one end of the trip piece to effect the rocking of the trip member, into the desired transverse position. The other arm 28 of the trip piece may be rounded at one corner with a radius having its center coinciding with the axis of the pivot pin 22 to permit the rocking movement. As also shown in Fig. 5, the slots 18, 19 on opposed sides of the bolt are of unequal length, the longer slot 18 having a closed end cooperating with the square end or corner of the arm 28 to limit clockwise movement of the trip piece, viewing Fig. 5, when aligning the trip piece longitudinally of the bolts, and, the shorter slot 19 having a closed end for cooperation with a slotted or grooved portion 30 formed in the side edge of the trip piece, the grooved portion being arranged to bear against and when clamping pressure is exerted by the nut to embrace the end wall of the slot in the adjacent wall section, serving to prevent lateral movement of the trip piece in its transverse position.

The present fastening element is herein illustrated as embodied in a building structure, and is shown as employed for fastening a hollow sheet metal wall panel member 40 to a structural steel supporting member 42 of the building. Such hollow sheet metal wall panels may comprise a pair of spaced facing sheets 44, 46 which may be provided with a body of insulation therebetween, as shown. In practice, when a panel is erected upon a structural member such as the angle shaped member 42, a hole is drilled through one leg of the structural member and through the adjacent facing sheet 44 of the wall panel. The fastener 10 with the trip piece 20 disposed parallel to the bolt as shown in Fig. 5, and with the nut 16 partially threaded onto the bolt is inserted through the aligned holes. When the trip portion of the bolt is dispersed entirely beyond the far side of the opening in the sheet 44 the trip member is then rocked into a transverse position, as described, and the nut tightened to complete the fastening operation. It will be observed that during the tightening operation, the trip piece 20 may move relative to its pivot pin 22, within the limits of the clearance hole in the trip member, so that the far edge of the trip member bears directly against the closed ends of the slots 18, 19 to apply the clamping load directly to the bolt.

From the above description it will be observed that the present construction of fastener is suitable for general use for securing together two or more members in a simple and efficient manner and may be used with particular advantage in structures wherein but one side or face of the members to be fastened is accessible to the person applying the fastener. When embodied in a building structure for securing hollow sheet metal insulated wall panel units, comprising the exterior walls of the building to the structural framework, the panels may be secured from the inside of the building with the fasteners extending through the interior facing sheet only of the panel, thus eliminating the disadvantages of through bolt construction formerly used, such disadvantages including the unsightly appearance of bolt heads on the exterior face; the necessity for waterproofing at the exterior fastening points; and the disadvantage of through heat conduction between the exterior and interior facing sheets of the panel units which had the effect of decreasing to some extent the efficiency of the insulation.

While the preferred embodiment of the invention has been herein illustrated and described, it will be understood that the invention may be embodied in other forms within the scope of the following claim.

Having thus described the invention, what is claimed is:

A fastener for securing together a plurality of members, comprising, a bolt threaded at one end and having an axial bore therethrough, the shank of said bolt being radially slotted intermediate the ends thereof, a generally rectangular retaining bar in said slot and pivoted to said bolt on a fixed axis laterally offset from the axis of said bolt, said bar being of a width no greater than and of a length substantially greater than the diameter of said bolt, said axis being so located that said bar may be pivoted thereon to lie entirely within said slot or to project transversely beyond both sides of said bolt, one edge of said bar having a notch defining shoulders engageable with an end of said slot and a side of said bolt when said bar extends transversely of said bolt, said bar being transversely serrated at the end thereof nearest said threaded end of said bolt when said bar lies entirely within said slot, said serrations then extending across said axial bore, one of the corners of the other end of said bar being cut away to define an edge generally concentric to said offset axis.

HENRY H. CRAFTON.

REFERENCES CITED

The following references are of record in the file of this patent:

UNITED STATES PATENTS

| Number | Name | Date |
|---|---|---|
| 644,115 | Waterman | Feb. 27, 1900 |
| 1,075,759 | Burridge | Oct. 14, 1913 |
| 1,269,912 | Dunham | June 18, 1918 |
| 1,371,396 | Reveny | Mar. 15, 1921 |
| 1,429,859 | Fassett | Sept. 19, 1922 |
| 2,072,066 | Cossentine | Feb. 23, 1937 |
| 2,161,390 | Schmalstieg | June 6, 1939 |
| 2,408,560 | Keehn | Oct. 1, 1946 |